United States Patent [19]

Donn, deceased et al.

[11] 4,183,459

[45] Jan. 15, 1980

[54] TESTER FOR MICROPROCESSOR-BASED SYSTEMS

[75] Inventors: Edward S. Donn, deceased, late of Portland, Oreg.; Michael D. Lippman, San Jose, Calif.

[73] Assignee: Fluke Trendar Corporation, Mountain View, Calif.

[21] Appl. No.: 899,756

[22] Filed: Apr. 24, 1978

[51] Int. Cl.² .............................................. G06F 11/00
[52] U.S. Cl. .............................. 235/302; 324/73 AT
[58] Field of Search .................. 235/302; 324/73 AT, 324/73 R; 364/580

[56] References Cited

U.S. PATENT DOCUMENTS

| | | | |
|---|---|---|---|
| 4,001,818 | 1/1977 | Radichel et al. | 324/73 AT X |
| 4,044,244 | 8/1977 | Fareman et al. | 235/302 |
| 4,045,661 | 8/1977 | Antoine et al. | 235/302 |
| 4,066,883 | 1/1978 | Wheeler, Jr. | 235/302 X |

OTHER PUBLICATIONS

Bisset "Exhaustive Testing of Microprocessors & Related Devices: A Practical Solution" 1977 Semiconductor Test Symposium pp. 38-41 Oct. 1977.
"3040A Logictester For Small MP Boards", Bulletin #105, Fluke Trendar, Mountain View, Ca. Jan., 1977.
"3040A Logictester Question & Answers", Bulletin #106, Fluke Trendar, Mountain View, Ca. Jun., 1977.

*Primary Examiner*—David H. Malzahn
*Attorney, Agent, or Firm*—Townsend and Townsend

[57] ABSTRACT

An automatic test apparatus coupled to a bit-directional internal data and control bus of a programmed microprocessor-based system tests the performance of the system in real time. Signal responses of the bus within a known good system are compared in real time to signal responses on the bus of an unknown system in order to identify faults. Faults are isolated by a sequential algorithm which stops operation at the occurrence of the first fault and thereupon traces the error to the subsystem or components supplying the indicated error signal to the bi-directional bus.

14 Claims, 7 Drawing Figures

TESTER FOR MICROPROCESSOR-BASED SYSTEMS

BACKGROUND OF THE INVENTION

1. Field of the Invention

This invention relates to automatic testing equipment (ATE) for dynamic testing of a microcomputer and specifically a microprocessor-based board. By a microprocessor-based board, it is meant a general-purpose central processing unit (CPU) or a special purpose microprocessor-based process controller, or the like, which is assembled in a self-contained package such as one or several circuit boards and is characterized by input and output terminals, (board edge inputs and outputs), at least one microprocessor unit (MPU), a bi-directional data and control bus coupled with the MPU, and at least some programmed logic functions (in either hardware or software form), and which is capable of performing complex system functions and executing instructions according to "intelligent", i.e., programmed, decision criteria. In particular, the invention is related to a technique for automatic operational (real-time) testing of a microprocessor-based board or system.

As the complexity of large scale integration (LSI) has increased and the applications for miniature and special purpose computers have expanded, the need for diagnosing errors in operational functions and faults in circuitry has also increased. Bus-connected LSI boards and MPU-based boards and systems have developed to such complexity that traditional testing is cumbersome and often impossible. While facilities and techniques for testing unprogrammed MPUs as well as LSI-type components, including random logic systems, are known to the art, such facilities and techniques have heretofore been inadequate for testing "intelligent" systems, such as programmed MPU-based boards or systems under actual operating conditions.

One difficulty in attempting to upgrade conventional ATE is the lack of facilities to automatically and sequentially search out and identify sources of errors and locations of faults within a bus-connected operating system. A second difficulty, which inhibits the diagnosis of faults, is the relatively limited access given the ATE to the internal operation of the system. The MPU-based board or system with its minimum component count and minimum number control and data lines represents a tremendously advanced system design. But, when such a system works improperly, i.e., requires debugging, the complexity of the debugging problem can defy diagnosis by previously known trouble-shooting techniques. There is thus a need for improved techniques and devices for automatically testing microcomputer-based boards and systems.

2. Description of the Prior Art

Logic testers for random logic systems are known. Many testers employ so-called spatial algorithms wherein faults are traced by physically isolating location. The application of spatial algorithms is generally limited to fault tracing of non-bus-connected random logic systems. Programmed components are typically isolated or removed from a tested system to simplify fault analysis.

Logic testers for some simple microprocessor-based systems are also known. Fluke Trendar of Mountain View, Calif., manufactures a line of microprocessor board testers utilizing nodal signature diagnostic and real-time comparative diagnostic techniques for testing of random logic boards, LSI-type boards and microprocessor-based boards. One such representative system is the Model 3040A. Testers and techniques have also been developed capable of testing complex and irregular LSI devices in real-time. A representative system is offered by Megatest Corporation of Sunnyvale, Calif. The level of complexity of a programmed microprocessor-based board, however, exceeds the current capability of these or other ATE to thoroughly analyze and detect faults. For example, known spatial algorithms are incapable of locating faults which create errors propagated through a programmed bus-connected system.

Therefore, with the increased availability and importance of microprocessor-based boards, there is an increased need for ATE capable of quickly and thoroughly diagnosing faults in complex programmed systems.

SUMMARY OF THE INVENTION

According to the invention, an automatic test apparatus is coupled to a bi-directional internal data, address and control bus of a programmed microprocessor-based system and tests the performance of a system in real-time by direct comparison with a known good system (reference system). Signal responses on the bi-directional bus in the reference system are compared in real-time to the unknown system, (system under test or test system), in order to sense failures. Failures are isolated by monitoring the digital signals on the bi-directional bus, and, according to a sequential algorithm, stopping the test at the first occurrence of a failure, identifying the status of the bus at the occurrence of the failure, and directing a search for the source of the failures. The technique is known as a "stop on first fail" algorithm. The "stop on first fail" algorithm prevents a failure from propagating through a system which would otherwise make it impossible to locate the source of the fault.

The bi-directional bus is coupled to the microprocessor unit and acts as a sequentially time-shared "spinal cord" among subsystems communicating with the microprocessor unit. As such, the bus represents a tight software/hardware feedback loop. According to the invention, therefore, the feedback loop is broken and the failure is traced by identifying the functional status of the bus and indicating the location of the failure through automatic reference to the microprocessor memory map. (The memory map is a correspondence between memory locations within the computer system and actual devices implementing those locations.)

OBJECTS AND FEATURES OF THE INVENTION

The principal object of this invention is to provide a means for automatically diagnosing faults of a programmed microprocessor-based board or system. This is accomplished by providing means for accessing and techniques for monitoring the bi-directional data and control bus coupled to the MPU on the microprocessor-based board to locate operational failures.

A further object of the invention is to operate two microprocessor-based boards in parallel real-time for test purposes, one of which is a system under test (test system or SUT). This is accomplished by stimulating both the reference system (REF) and the SUT by peripherals (input and output devices) common to both systems or by a common stimulus generator. In addition, means are provided for synchronously clocking the operation of both the REF and the SUT.

A further object of the invention is to provide a diagnostic algorithm for locating faults. The algorithm is operative to simultaneously stop the operation of the REF and the SUT at the first occurrence of non-coincident signals on the MPU bus. The algorithm employs direct information, data information, and status information derived from the monitoring of all input and output terminals of the MPU and the memory map of the SUT to locate and display the source of the failure. A display may indicate which channel is the source of the error. The term "channel" refers to that device corresponding to a particular memory address. A channel is identified from the information obtained at the First Failure and through the memory map.

A still further object important to the operation of the invention is to provide an ability in the tester itself to utilize key information fed to the MPU, and particularly to identify the status and operational mode of the bi-directional bus.

Other objects and advantages will be apparent by reference to the following detailed description.

BRIEF DESCRIPTION OF THE DRAWINGS

FIGS. 2A, 2B and 2C are referred to collectively as FIG. 2.

DETAILED DESCRIPTION OF THE PREFERRED EMBODIMENTS

Figure 1:
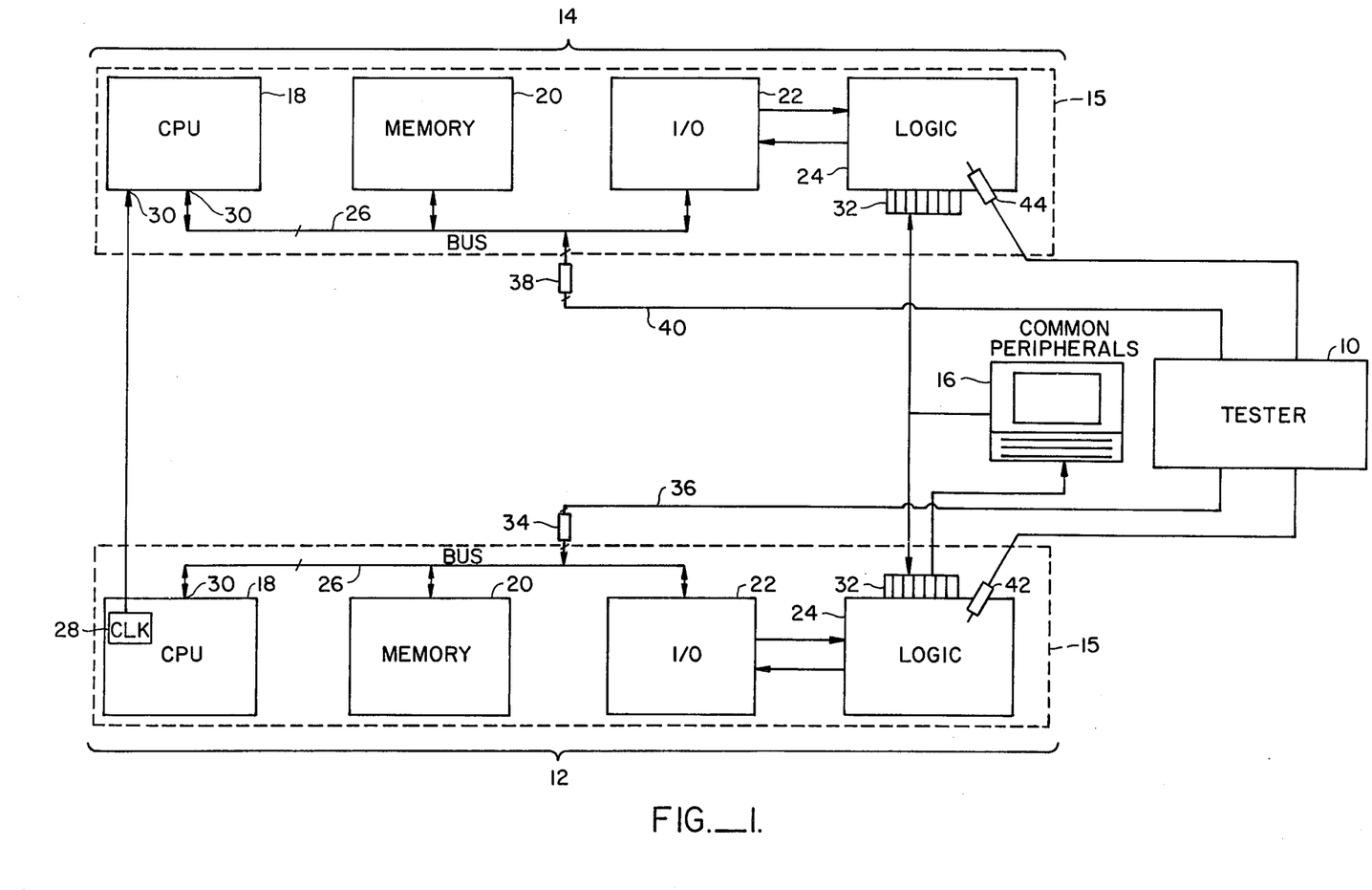
FIG. 1 is a block diagram of a tester according to the invention illustrating the testing environment.

FIG. 1 illustrates a test system environment embodying the invention. The environment includes a testing apparatus 10, a programmed computer system to be tested, "SUT" or "test system" 12, a system for comparison with the test system, "REF" or "reference system" 14 and operational peripheral devices 16 coupled through digital logic to the test system 12 and the reference system logic.

The peripheral devices 16 operate to stimulate both the test system 12 and the reference system 14 in synchronism. The peripheral devices 16 may be input/output equipment actually used in an operational system, such as displays, keyboards, printers and sensors, or there may be provided a stimulus generator which is operative to simulate actual input/output signals.

The basic architecture of the programmed system 12, 14 is also illustrated in FIG. 1. Each system 12, 14 is self-contained on a circuit board 15. Each system 12, 14 comprises a digital central processing unit (CPU) 18, memory 20, an input/output subsystem 22, interface logic 24 and bi-directional (or three-state) data and control bus 26. A clock 28 or clock input 30 is associated with each CPU 18.

The memory 20 comprises a storage medium for digitized data and for an ordered set of operational instructions (a program) for the CPU 18. The program may be permanently resident in memory 20, for example, in the form of a read only memory, or it may be temporarily resident, as in a random access memory having read and write capabilities.

In order for the programmed test and reference systems 12 and 14 to be self-contained, the CPU 18 comprises a microprocessing unit which is generally provided in a single unit package (chip) with multiple terminals 30. A typical microprocessing unit chip has forty terminals. The terminals 30 are coupled to the bi-directional bus 26.

The bus 26 is the main control and data information conduit of the programmed systems 12, 14, and it is adapted to transmit information rapidly in both directions and in time-multiplexed format between subsystems coupled thereto.

The programmed systems 12, 14 communicate with the external environment through a further terminal set at the edge of the circuit board, often called a board edge connector 32. The edge connector 32 couples with the system interface logic 24, which in turn couples with the input/output system 22, which in turn communicates with the bus 26.

According to the invention, in order to diagnose faults in the test system 12, the testing apparatus 10 is directly coupled to the bi-directional bus 26 of the test system 12 through a test bus probe 34 via a test bus cable assembly 36, and also to the bus 26 of the reference system 14 through a reference bus probe 38 via a reference bus cable assembly 40. The coupling is made in such a manner that comparison between simultaneous signals on the respective buses 26 can be made to detect non-coincidences ("failure") and to automatically trace them to their sources based on the information supplied by the bus 26. In addition, a manual test probe 42 and a manual reference probe 44 may be provided for manually tracing faults not associated with the bus 26.

Figures 2A, 2C:
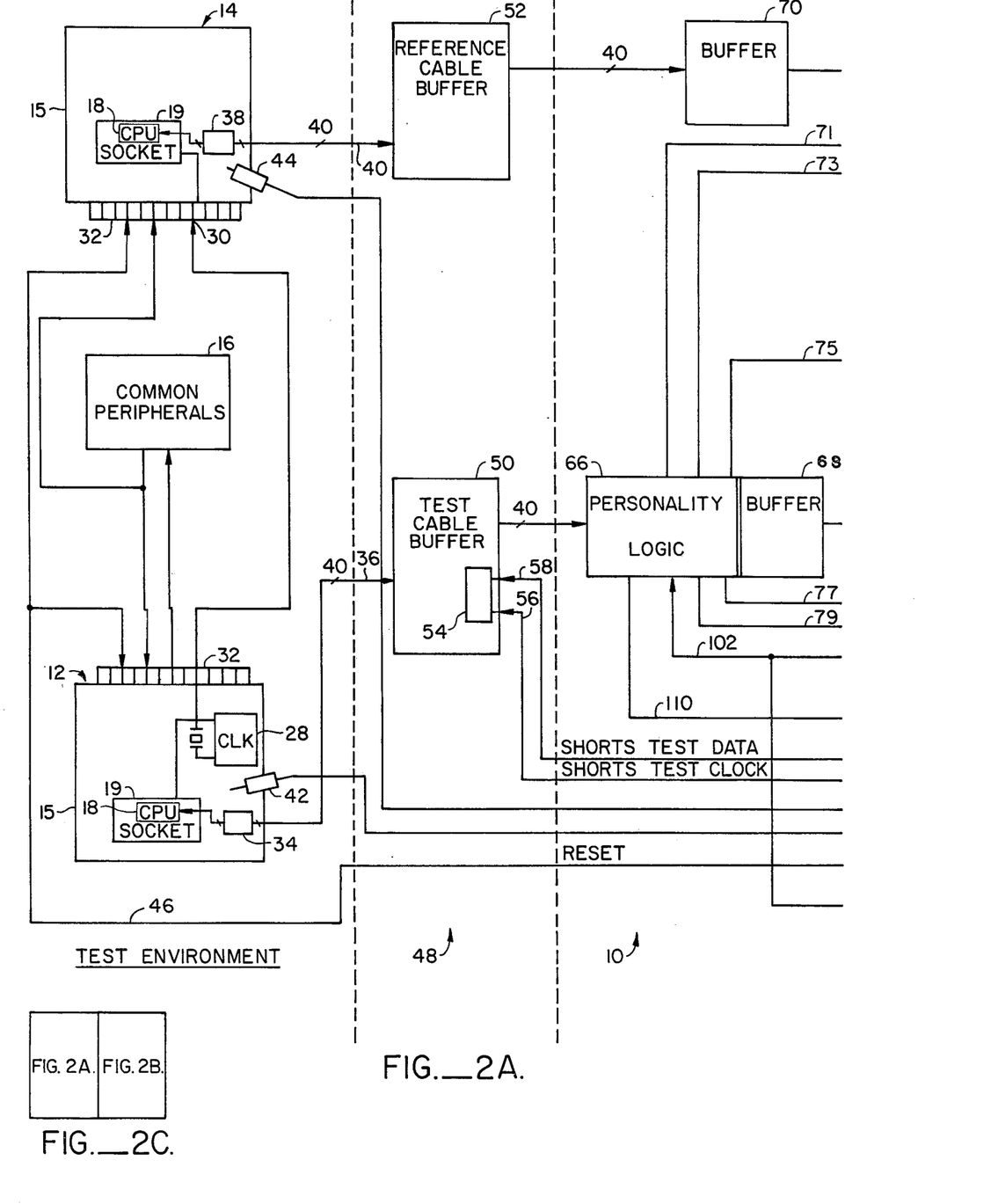
FIGS. 2A and 2B are together a detailed block diagram of the tester of FIG. 1
FIG. 2C illustrates the manner in which FIGS. 2A and 2B relate.
Figure 2B:
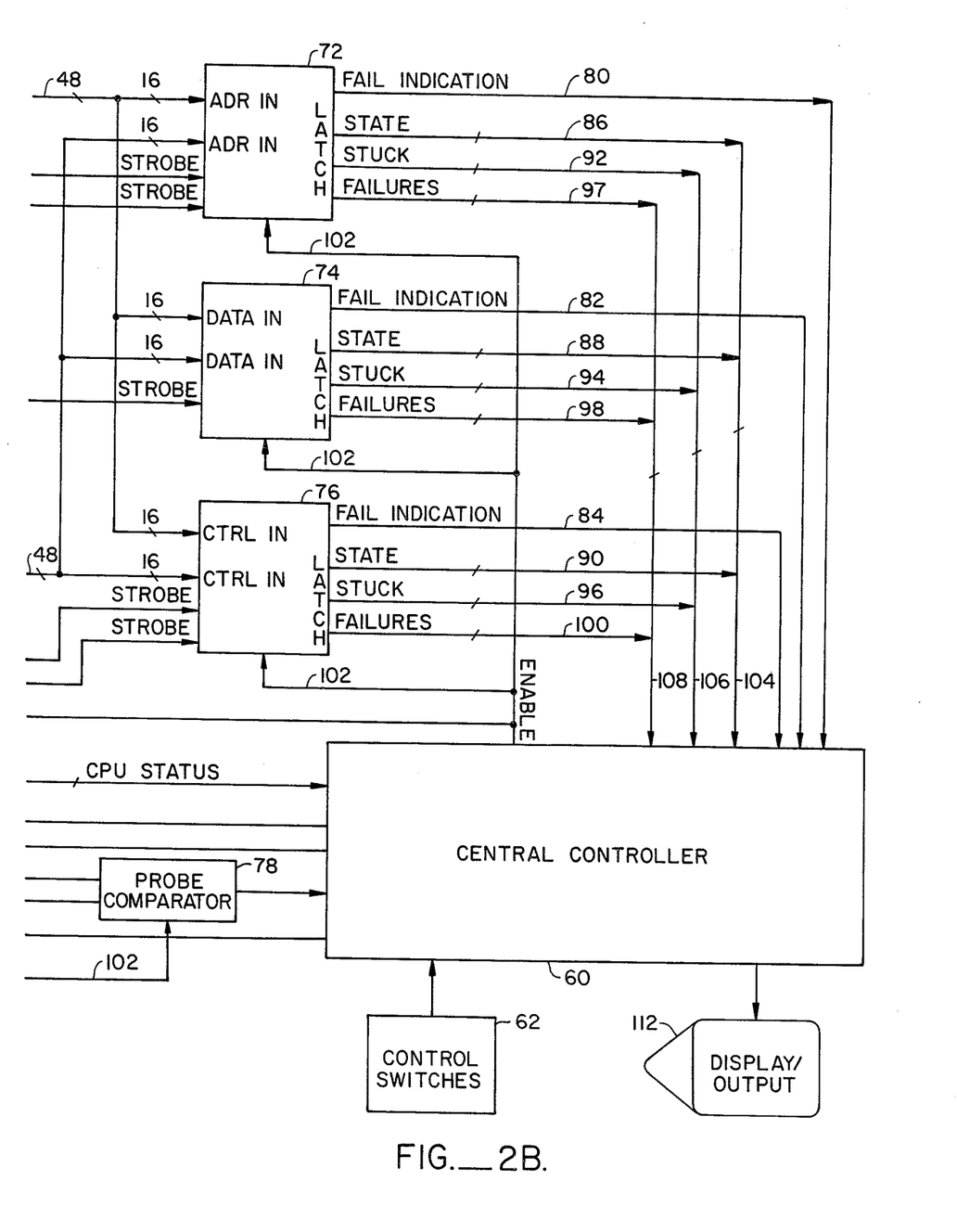

Turning now to FIG. 2, there is shown the testing apparatus 10 of FIG. 1 in greater detail. In addition to the interconnections shown in FIG. 1, the test system 12 includes a clock (MPU clock) 28 which is coupled to the test system CPU 18 in a CPU socket 19 and to the reference system 14. The MPU clock 28 is operative to synchronize the reference system 14 with the test system 12 to assure precisely synchronous operation.

In the preferred embodiment, the multiple terminal probes 34, 38 are each typically a forty-pin connector (corresponding to the number of CPU 18 terminals). The probes 34, 38 are generally attached directly to the test unit CPU 18 and reference unit CPU 18 in CPU socket 19.

A cable assembly 48 interconnects the testing apparatus 10 and the test environment. The cable assembly 40 includes the forty-line bus cables 36, 40 adapted to convey all signal information coupled to the CPU 18, which in turn are coupled respectively to a test cable buffer circuit 50 and a reference cable buffer circuit 52.

The respective cable buffer circuits 50, 52 are operative to buffer the inputs and outputs of the CPU 18 for driving the diagnostic circuitry of the testing apparatus 10.

The sequential diagnostic algorithm according to the invention cannot be accurate if the bus 26 contains short circuits. Therefore a separate test and test configuration is needed to check the bus 26 (FIG. 1) of the test system 12 for short circuits. For a shorts test, the buffer 50 is adapted to include logic circuitry 54 for testing for internal shorts on the test system bus 26. The shorts test logic circuitry 54 (FIG. 2) may specifically include a shorts test register (not shown), which is a three-state register. The shorts test register is responsive to shorts test data via a shorts test data line 58 and to a shorts test clock 56.

The shorts test sequence is undertaken as follows: The tester 10 is preprogrammed with an indication of which CPU terminals 30 (FIG. 1) are permanently stuck in high or low states so that those terminals are ignored. The CPU 18 is removed from its socket 19 in the test system 12 for the duration of the shorts test. The multiple terminal probe 34 is then connected to the test system CPU socket 19 to force all possible lines of bus 26 to float. Thereafter the shorts test register is cleared to zero. Then all lines of bus 26 are tested one at a time for any which are stuck in a high state. Thereafter a single high bit is clocked through the shorts test register one place at a time for each of the bus lines to change each of the bus lines high one at a time. Each of the other bus lines is also tested to determine if any of the other bus lines has also changed state. In this manner each of the bus lines is checked to determine whether it is stuck high, stuck low or stuck together with another bus line.

Referring now to the testing apparatus 10 per se, the essential components are a central controller 60, control switches or buttons 62, a display device 64 (such as a cathode ray tube (CRT) or the like), cycle or personality logic 66, test and reference buffers 68 and 70, and various special purpose comparator and latch subsystems 72, 74, 76 and 78.

The bus 26, being bi-directional and sequential, contains information whose significance varies with time. By way of example (with reference to FIG. 1), the information the bus 26 at one instant may be output from the CPU 18 to a particular memory 20 or I/O subsystems 22. At another instant the bus contained-information may be input data to the CPU 18. At still another instant the CPU 18 may use the bus 26 to identify to other subsystems state information on its current operation or state. Address as well as data information may be time-multiplexed onto the common bus 26. The bus may also exhibit an "off" state (characterized by a high impedance) during which time signals on the bus 26 have no significance.

The testing apparatus 10 must be capable of responding to or decoding the significance of each signal or state occurring on the bus 26. The personality logic 66 is tailor designed to the characteristics of the type of CPU 18 employed in the test system 12. The personality logic is operative to generate specialized strobe signals (via strobe lines 71, 73, 75, 77 and 79) and status signals (via CPU status bus line 110) for correct operation of the testing apparatus 10 with the particular CPU 18. The personality logic 66 is combined with test buffer 68 to direct the timing and the routing of microprocessor signals to the comparator inputs.

The strobe signals are for time demultiplexing the sequential bus line signals which enables the central controller 10 to sort out the information flowing on the bi-directional bus 26, and eventually to separate failure sources. For example a data strobe carried via line 75 is derived by the personality logic 66 to identify those instants at which the bus 26 contains valid data. A status strobe, carried by lines 71, 77, is similarly derived for identifying the particular process cycle in progress. The status strobe further defines the type of information transfer taking place on the bus 26. An address strobe, carried via line 73, identifies when a valid address is being presented on the bus 26. Further strobes, as for example a control strobe carried via line 79, are employed to sample the states of the various control signals to and from the CPU 18, and also to time demultiplex shared address/data terminal input and output terminals of the CPU 18. The personality logic 66 and buffers 68 and 70 may include storage registers (not shown) for temporarily storing digital information which can then be transmitted in parallel with subsequent information through an enhanced line output bus of the buffers 65 and 70. In the preferred embodiment the buffers 65 and 70 are provided with forty input lines whereas a forty-eight line output is provided.

Turning now to the comparator and latch subsystems, the first comparator and latch subsystem, herein the address comparator/latch 72, is coupled to receive parallel address signals from both the reference system buffer 70 and the test system buffer 68. The second comparator and latch subsystem, herein the data comparator/latch 74 is coupled to receive data information from the reference system buffer 70 and test system buffer 68. The third comparator and latch subsystem, herein the control/miscellaneous comparator/latch 76, is coupled to receive control signals and other miscellaneous signals from the reference system buffer 70 and test system buffer 68.

The fourth comparator subsystem, herein the probe comparator 78, is an optional comparator coupled directly to the manual probes 42 and 44. The comparator/latches 72, 74 and 76 are adapted to compare reference system bus signals and test system bus signals in parallel operational relation. Each of the comparator/latches 72, 74, 76 provides four output types, namely a "Fail Indication" 80, 82 and 84, a state description ("State") 86, 88 and 90, a stuck register description ("Stuck") 92, 94, 96 and a failure description ("Failures") 96, 98 and 100.

In order to assure that the reference system 14 and test system 12 commence operation under identical conditions, the central controller 60 provides a reset mechanism via a reset signal line 46.

A Fail Indication signal 80, 82, 84 is generated whenever a comparator detects non-coincidence between outputs of the reference buffer 70 and the test buffer 68. The particular Fail Indication signal identifies the type of failure, namely address, data or control. When failure occurs, the controller 60 immediately removes enable signals via signal 102 from the comparators 72, 74, 76, 78 and the personality logic 66. This freezes the state of the latches in the comparator/latch subsystems 72, 74, 76 prior to the occurrence of the next timing strobe and thereby captures the State, Stuck and Failures description in the current location. The State buses 86, 88 and 90 are merged into a single State bus 104, the Stuck buses 92, 94 and 96 are merged into a single Stuck bus 106 and the Failures buses 96, 98 and 100 are merged into a single Failures bus 108. The Failures bus 108 identifies the address of the non-compare signals. The Stuck bus 106 identifies the signals which have never experienced logic state transitions. The State bus 104 identifies the address and status of the system program at failure.

The removal of the enable signal via signal line 102 to the personality logic 66 also causes a latch (not shown) in the personality logic 66 to provide a CPU status signal 110 to the controller 60. The system information provided by the comparator/latches 72, 74 and 76 and the CPU status information disclose to the central controller 60 the identity and the location of faults within the test system 12.

Figure 3:
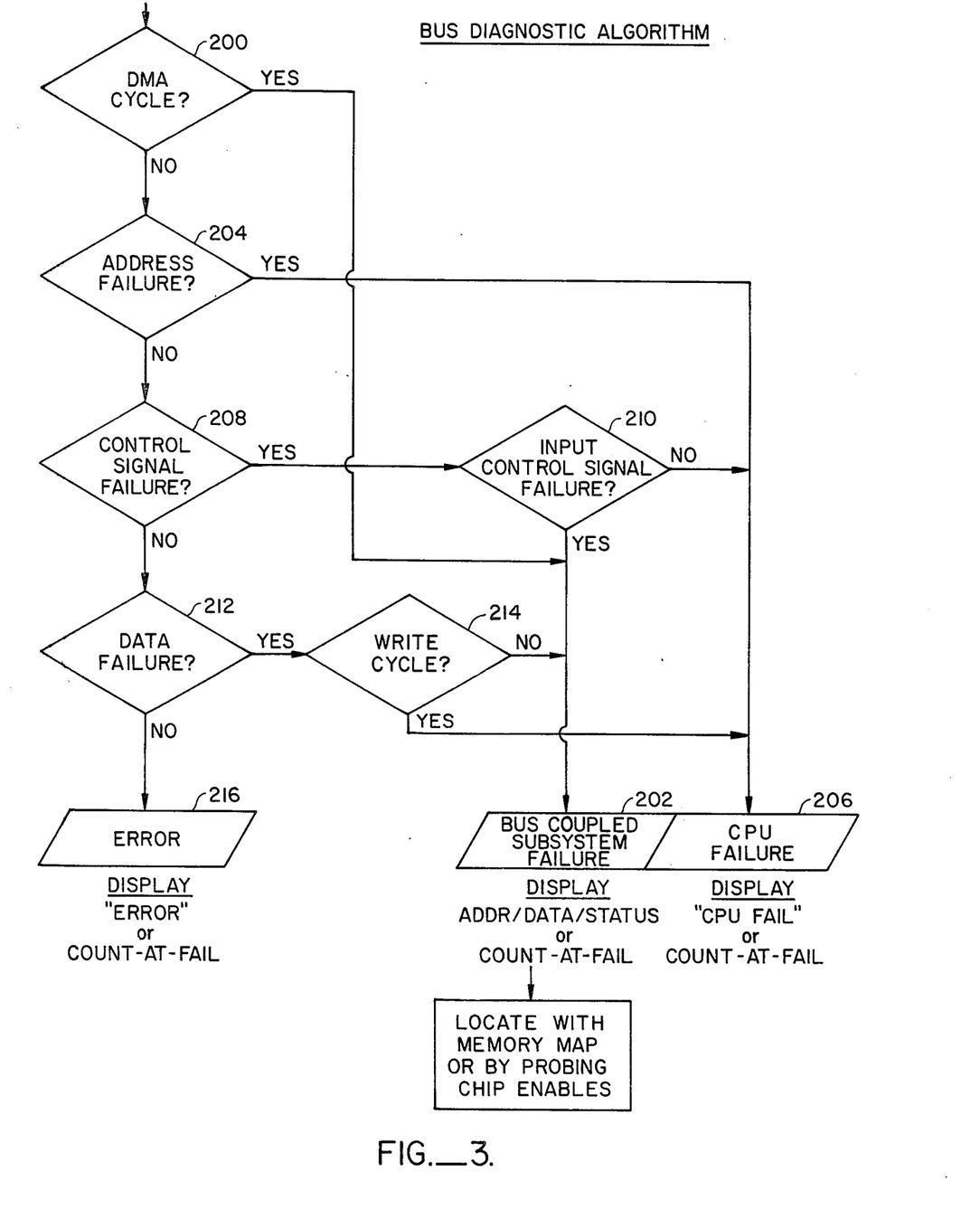
FIG. 3 is a flow chart illustrating the sequential diagnostic algorithm according to the invention.

A sequential diagnostic algorithm shown in FIG. 3 is the technique employed by the central controller 60 to analyze the information and to present the analysis in useful form to a display/output device 112.

The separate Fail Indication signals via signal lines 80, 82 and 84 serve as flags permitting the controller 60 to separate address, data and control failures according to the sequential diagnostic algorithm of FIG. 3.

Once a failure has been sensed (via signal lines 80, 82 or 84) the controller 60 checks CPU status (signal line 110). If the CPU 18 is operating in a direct memory access (DMA) cycle (step 200) the controller 60 immediately identifies and signals a Bus Device Failure (step 202), causing display of current address, data and status information. This information will indicate failure at a specific bus-connected subsystem. Using this information, the user with the help of a program memory map of the test system 10 locates the defective bus-coupled subsystem. The memory map may be automatically referenced by the controller 60 through a separate algorithm that compares the address, data and status information with the parameters of a memory map description. A description of an automatic memory map search is given hereafter. If the failure is not located in a bus-coupled subsystem, then the bus-coupled subsystem propagating the failure is used as a starting point to locate the failure through a conventional spatial diagnostic algorithm using the manual probes 42, 44.

If a failure does not occur on a DMA cycle, the controller 60 then checks for address failure (step 204), that is, non-coincidence between the address information of the test system 12 and the reference system 14 indicated by signal line 80. A positive address failure indication points to a failure in the CPU 18 (step 206) thereupon the controller 60 causes display of "CPU FAIL" or the like, or the cycle count at fail (operational termination).

If no address failure is indicated (step 204), then the controller 60 checks for a control signal failure (step 208) as indicated by signal line 84. If a control signal failure is positively indicated, the controller 60 checks the CPU status line 110 to determine if the condition occurred during control input (step 210), thereby indicating input control signal failure. A positive indication points to a bus-coupled subsystem failure (step 202) locatable with the help of the program memory map previously described. A negative indication points to a CPU failure (step 206).

If no control signal failure is indicated (step 208), then the controller 60 checks for data failure (step 212) as indicated by signal line 82 (FIG. 2). If data failure has occurred, the controller 60 checks CPU status through line 110 to determine if the condition occurred during a write cycle (step 214). A positive indication points to CPU failure (step 206). A negative indication points to a bus-coupled subsystem failure (step 202).

If no data failure has been indicated (step 212), then the controller 60 signals occurrence of an extraneous failure. An error sign (step 216) is caused to be displayed together with the program count at fail. The error sign generally indicates a problem which is not caused by the test system 12 and therefore not within the capability of the testing apparatus 10 to diagnose automatically.

In summary, a controller 60 embodying the sequential diagnostic algorithm comprises a means for indicating the nature of the non-coincidence between the reference system 14 and the test system 12 and a means for designating the bus-coupled subsystem originating the non-coincidence. Thus a test apparatus 10 incorporating the sequential diagnostic algorithm greatly facilitates the isolation of programmed microprocessor-based board/system faults.

Figure 4:
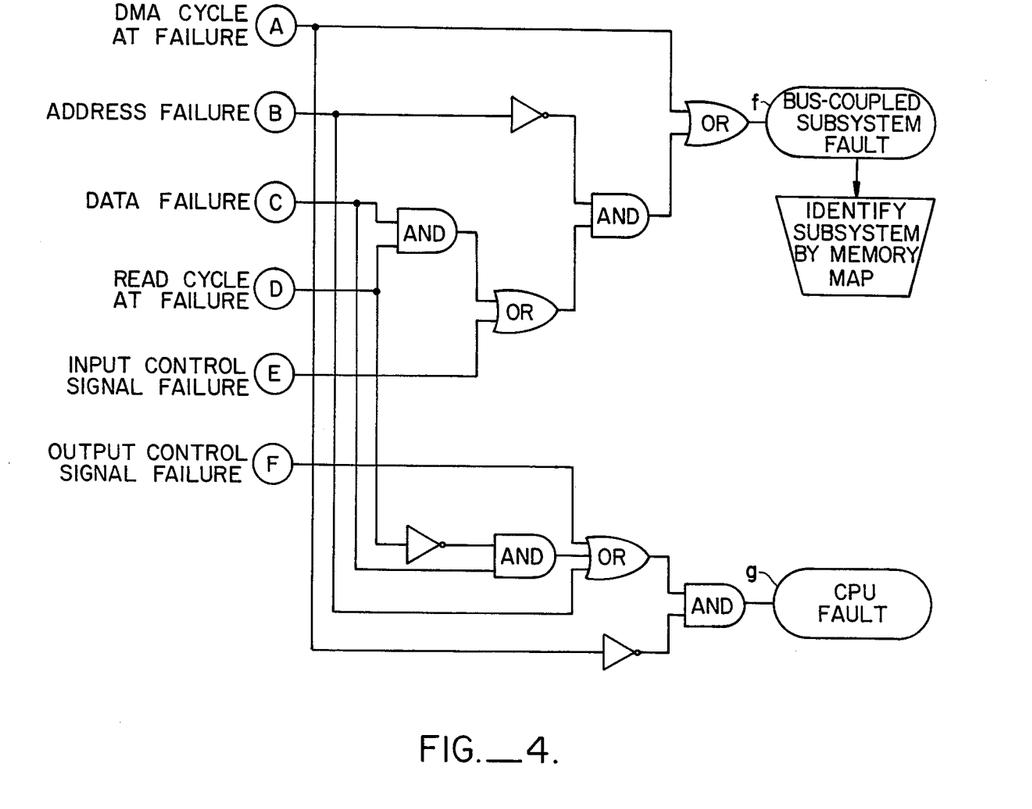
FIG. 4 is a circuit diagram according to the sequential diagnostic algorithm.

The sequential diagnostic algorithm of FIG. 3 may be embodied as either a hard-wired circuit of digital logic gates or in software form. FIG. 4 illustrates one circuit embodiment employing AND, OR and inverter gates. The circuit separates failures into either bus-coupled subsystem faults or CPU faults according to the following Boolean logic equation:

$$f = A + \bar{B}(CD + E) \qquad \text{Eq. 1}$$
$$g = \bar{A}(B + \overline{CD} + F) \qquad \text{Eq. 2}$$

where f is TRUE if there is a bus-coupled subsystem failure
g is TRUE if there is a CPU failure
A is TRUE if the system is on a DMA cycle at failure
B is TRUE if there is an address failure
C is TRUE if there is a data failure
D is TRUE if the system is on a read cycle at failure
E is TRUE if there is an input control signal at failure
F is TRUE if there is an output control failure.

FIG. 4 represents a schematic diagram of a circuit according to Equations 1 and 2.

The test system memory map may be embodied manually by reference to printed documentation or automatically through an auxiliary memory map input device 63 (FIG. 2) coupled to the central controller 60. The identification of a faulty bus-connected subsystem may then become the starting point of a technique or algorithm for automatically guiding the user to the faulty device or node (terminal). One such guide probe algorithm is the Autotrack ™ algorithm embodied in the Model 3040A Logic Tester built by the Fluke Trendar Corporation of Mountain View, California.

The implementation of the search for the program or data location of failure comprises first specifying the program address or address range of each of the bus-coupled subsystems. Thereafter, utilizing the tester-generated address at failure, sequentially searching the address entries in the memory map until a matching address or correlated address range is found. Then comparing the data bus bits for which failure occurred against known information about which data bus bits are associated with that particular entry in the address map. This last step is necessary because each data bus bit may designate a different subsystem coupled to the data bus. For example, if 1024 8-bit bytes (words) of read-write memory are implemented with eight separate 1024×1 bit random access memory (RAM) chips, eight entries are needed for that range of 1024 addresses, and each entry would be identifiable only by matching with the data bus bit corresponding to each chip.

However, once the address at failure has been isolated and the correct data bus bit has indicated which chip is active at failure, the tester has isolated the bus-coupled subsystem causing the error.

Details about specific implementation of the search technique depend upon the architecture of the apparatus which actually carries out the search technique. One suitable apparatus is the Fluke Trendar 3040A Logic Tester mentioned above. The organization of the data base, in this case a memory map, stored in the logic search apparatus determines the search implementation.

One example of one possible organization for search implementation is given in the table below. In the table, the first three columns are in hexadecimal (base 16) notation and the last column is in character notation such as ASCII code. Column 3 is a data bit mask for identifying data bus bit position of a device coupled to the data portion of bus 26 (FIG. 1). The example is shown for a 16-bit address and 8-bit data bus configuration. Entries 2 through 9 exemplify the 1024×1 bit RAM chips of the above example. Entry 1 is for a 2048×8 Read Only Memory (ROM) chip.

TABLE

MEMORY MAP DATA ORGANIZATION

| EN-TRY | START ADDRESS | STOP ADDRESS | DATA MASK | SUBSYSTEM IDENTIFIER |
|---|---|---|---|---|
| 1 | 0000 | 07FF | FF | U27 - PROG. ROM |
| 2 | 8000 | 83FF | 80 | U45 - RAM BIT 7 |
| 3 | 8000 | 83FF | 40 | U44 - RAM BIT 6 |
| 4 | 8000 | 83FF | 20 | U43 - RAM BIT 5 |
| 5 | 8000 | 83FF | 10 | U42 - RAM BIT 4 |
| 6 | 8000 | 83FF | 08 | U41 - RAM BIT 3 |
| 7 | 8000 | 83FF | 04 | U40 - RAM BIT 2 |
| 8 | 8000 | 83FF | 02 | U39 - RAM BIT 1 |
| 9 | 8000 | 83FF | 01 | U38 - RAM BIT 0 |

Figure 5:
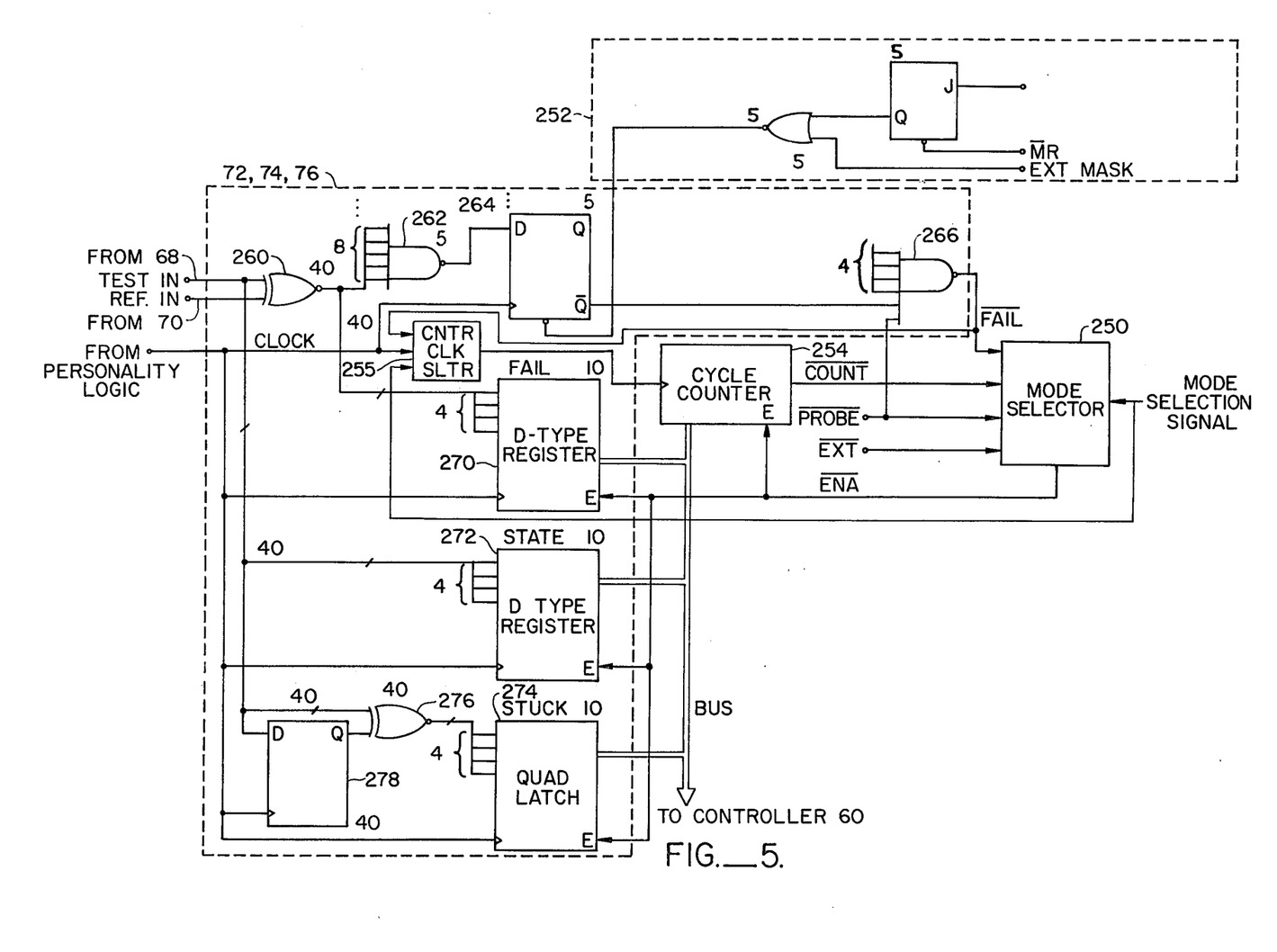
FIG. 5 is a circuit diagram of a preferred embodiment of the primary data collection functions according to the invention.

Referring now to FIG. 5, there is shown a schematic diagram of one embodiment of a digital circuit implementing the basic data gathering function of the comparator/latches latches 72, 74 and 76 (FIG. 2) together with selected auxiliary functions. The auxiliary functions include a mode selector 250, and address/mask circuit 252 and a cycle counter 254.

The comparator/latch latch subsystems 72, 74, 76 comprise a comparator section, a failure indication section and a three-state latch section.

The comparator section comprises forty EXCLUSIVE OR gates 260 (with inverted outputs) connected in parallel to the reference system buffer 70 and the test system buffer 68 (FIG. 2).

The three-state latch section includes a first array 270 of ten four-input D-type registers, such as type 8551 (manufactured by National Semiconductor Corporation of Santa Clara, California), a second array 272 of ten four-input D-type registers, also type 8551, and a third array 274 of ten four-bit latches or quad latches such as type 8544 also manufactured by National Semiconductor Corp.

The inputs of the first array 270 are derived from the outputs of gates 260. The first array 270 is operative to store failing pin information, if any, and to make that information available to the controller 60.

The inputs of the second array 272 are derived from the outputs test buffer 68. The second array is operative to store all binary state information and to make it available to the controller 60.

The third array 274 derives input from an array of 40 dual input EXCLUSIVE OR gates 276 whose inputs consist of the state information from test system buffer 68 and from forty parallel delay circuits 278 (D-type flip flops). The third array is thus operative to store the compared current and previous state information to determine if there has been activity on each information line indicating stuck pins and to make the information available to the controller 60.

The failure indication section comprises the outputs of gates 60 coupled in groups of five to eight five-input NAND gates 262, each of which is coupled to a fault latch 264. The eight fault latches 264 comprise D-type flip flops. The inverted outputs $\overline{Q}$ are coupled to one nine-input NAND gate 266. In operation, a non-coincidence at any of the comparators 260 is propagated to the fault latches 264 which signals a Failure Indication at the output of gate 266, to the mode selector 250. In the normal fault sensing mode, the Failure Indication disables the cycle counters 254 and freezes all latches.

Other test modes of operation of the test apparatus 10 besides "stop-on-first-fail" may include "stop-on-count", "stop-on-Nth-fault", "stop-on-probe" and "stop-on-external-signal".

In the "stop-on-count" mode the mode selector 250 monitors the $\overline{\text{COUNT}}$ signal line from cycle counter 254. When the cycle counter 254 registers a predetermined count, which has been entered by the operator via keyboard control switches 62 (FIG. 2), the mode selector 250, through the $\overline{\text{ENA}}$ signal line, it causes all registers and latches 270, 272, 274 to be loaded with the current test information.

The "stop-on-probe" mode is normally employed after a bus failure has been identified in order to isolate a non-bus-coupled failed subsystem. The manual probes 42, 44 (FIG. 1) are coupled to comparator 78 (FIG. 1) whose output as $\overline{\text{PROBE}}$ (FIG. 5) is provided to at least one of the NAND gates 266 (FIG. 5) and to the mode selector 250. The manual probes 42, 44 are employed according to conventional spatial diagnostic techniques to isolate the subsystem or device generating bad (non-coincident) outputs from good (coincident) inputs.

In the "stop-on-external-signal" mode, the test apparatus 10 is operative to stop and latch data on an external signal. It is used when the test apparatus 10 is interfaced with other testers, as well as for diagnostic testing of the test apparatus 10 itself.

The "stop-on-Nth-failure" mode enables the operator to terminate system operation on a sensed non-coincidence other than the first sensed non-coincidence. This feature is particularly useful in testing circuitry or components which cannot be initialized such as a memory refresh controller having an internal counter (such as the Intel 3222 of the Intel Corporation, Santa Clara, California) or an analog-to-digital (A/D) converter. Uninitializable circuits may cause meaningless non-coincidences to be detected as failures, such as non-coincidences resulting from start-up. In addition, this test mode may provide useful information by indicating how a real error would propagate through a system if the test system is allowed to continue operating after a failure occurs.

Referring to FIG. 5, to implement the "stop-on-Nth-failure" mode a counter clock selector 255 is provided at the input of the cycle counter 254. The cycle counter 254 in operation is preloaded with N, the number of failures to be ignored. The counter clock selector 255 monitors the $\overline{\text{FAIL}}$ signal output of NAND gate 266 to cause the cycle counter 254 to be clocked once each failure. Consequently the mode selector 250 inhibits the transition of the $\overline{\text{ENA}}$ signal in response to the $\overline{\text{FAIL}}$ signal until the $\overline{\text{COUNT}}$ signal line from the cycle counter 254 indicates that the predetermined number of failures has been counted.

One further feature of the invention is a masking function provided by the address/mask circuit 252. The address/mask circuit 252 provides two types of masks, a hard-wired mask (EXT MASK) and a software-derived mask (ADDRESS). The masking function is particularly useful when the test system 12 cannot be immediately initialized. The hard-wired mask (EXT MASK)

couples to the reset input of the fault latch 264. The software-derived mask (ADDRESS) is initially loaded into an array of J-type flip flops on the master reset ($\overline{MR}$) signal and then is coupled to the fault latch 264. EXT MASK is operative to mask failures when TRUE. The ADDRESS mask is intended to mask all failures until a specified address occurs.

The invention has now been explained with reference to specific preferred embodiments having particular advantages over the prior art. In summary and by way of example of the numerous advantages, the following key features are noteworthy. The inventive test apparatus provides access to the principal bi-directional bus of a programmed microprocessor based system, which considerably simplifies system diagnosis as compared with prior art edge connected testers. The invention is optimized for sequential bus-coupled operating systems such as programmed systems, as contrasted to random logic systems.

The invention provides controlled synchronous multiple clocking functions, which simplify diagnosis of programmed systems. Moreover, the invention allows for system diagnosis through program location and subsystem status analysis. Address, data and status information is segregated, and a memory map is used to trace errors.

The invention provides a display of the channel at fault rather than the failed pin. Inherent in the invention is the capability of deciphering the information on a time-multiplexed bi-directional bus.

A further feature is the capability of automatically testing for shorts on the bi-directional bus. Without this feature, the "stop-on-first-fail" algorithm can be defeated.

The sequential diagnostic algorithm herein disclosed may also be adapted to be embodied in any testing machine which is capable of sequentially monitoring all machine cycles and of stopping on the first failure of signal coincidence with a reference. For example, the algorithm may be implemented with a logic state analysis-type tester, a truth-table-type tester, or comparison-type tester. However, the algorithm cannot be implemented on signature-type testers since such testers cannot recognize the first sequential failure.

Other features, advantages and obvious modifications will be apparent from the foregoing description to those of ordinary skill in the art. It is therefore not intended that this invention be limited except as indicated by the appended claims.

We claim:

1. An apparatus for testing a substantially self-contained programmed computer system, designated a test system, for identity of operation with a second substantially self-contained programmed computer system, designated a reference system, the test system and the reference system being adapted to synchronously respond to a common clock means and a common external input/output signal generating means, each said programmed computer system including subsystems, namely a digital central processing unit, a memory means for a resident operational program and data storage, input/output interface means for communicating with the input/output signal generating means, and a bi-directional bus coupled to each of said subsystems and operative to communicate digital signals between said subsystems, the testing apparatus comprising:

first means including a signal connector for connecting said testing apparatus to the test system bus for detecting said digital signals thereon;

second means including a signal connector for connecting said testing apparatus to the reference system bus for detecting said digital signals thereon;

means coupled to said first bus signals detecting means and to second bus signals detecting means, corresponding signals of said first and second bus signals detecting means being paired for comparing test system bus signals and reference system bus signals synchronously to detect non-coincidence therebetween;

means for simultaneously terminating operation of the test system and of the reference system upon detection of said non-coincidence; and means for indicating the nature of said non-coincidence.

2. An apparatus according to claim 1 wherein the central processing units of the test system and the reference system are each a microprocessor having a plurality of terminals, said microprocessor being removably mountable in socket means of the central processing unit and wherein said first and second detecting means each further comprises a multiple-terminal microprocessor connector means which couples said socket means with said microprocessor and further comprises buffer means coupled between said microprocessor and said comparing means.

3. An apparatus according to claim 1 wherein said comparing means comprises an array of dual-input EXCLUSIVE-OR gates and an array of storage registers, the first input of each of said gates being coupled to receive said bus signals from said first detecting means, the second input of each of said gates being coupled to receive said bus signals from said second detecting means, the output of each of said gates being coupled to an input of one of said storage registers, said terminating means being coupled to register an indication of non-coincidence between inputs of each said gates and to cause storage of a representation of said non-coincidence.

4. An apparatus according to claim 3 wherein said indicating means includes means coupled to said test system bus for storing a representation of said digital signals thereon in response a registered indication of non-coincidence from said latch means.

5. An apparatus according to claim 4 wherein said indicating means further includes means for sensing and storing signal indications of signal lines of said bus having experienced no signal change.

6. An apparatus according to claim 5 wherein said sensing means comprises an array of further dual-input EXCLUSIVE-OR gates and an array of further storage registers, the output of each said further register being coupled to one input of each of said further gates, the input of each said further register and the other input of each said further gate being coupled to receive said test bus signals.

7. An apparatus according to claim 1 further including means for designating the bus-coupled subsystem originating the non-coincidence.

8. An apparatus according to claim 7 wherein said designating means is operative to designate between a central processing unit failure and a failure in another bus-coupled subsystem according to the following equations:

$$f = A + \overline{B}(CD + E)$$

$$g = \overline{A}(B + C\overline{D} + F)$$

where
- g is TRUE if there is central processing unit failure;
- f is TRUE if there is a failure in another bus-coupled subsystem;
- A is TRUE if the programmed system is operating on a direct memory access cycle during failure;
- B is TRUE if there is an address failure;
- C is TRUE if there is a data failure;
- D is TRUE if the programmed system is operating on a read cycle at failure;
- E is TRUE if there is an input control failure; and
- F is TRUE if there is an output control failure.

9. In a digital test environment having means for providing external real-time signal stimulus to a plurality of identical programmed systems including at least a reference system and one system under test (test system), each said reference system and test system having data and control bus means, a microprocessor-type central processing unit and subsystems coupled to said bus means, said environment further having means adapted to be coupled directly to data and control signal bus means of said test system for monitoring bus signals and means for comparing the bus signals of said reference system with the bus signals of said test system, and means for storing the signal response of said test system, a method of locating faults in said system under test comprising:

(a) exercising each said system synchronously;
(b) comparing in real-time the bus signals of said reference system with said test system;
(c) terminating said exercising at a designated indication of non-coincidence of any corresponding bus signals; and
(d) identifying a channel originating the non-coincidence by reference to bus address, data and status signals at the occurrence of said designated non-coincidence.

10. A method according to claim 9 wherein said channel identifying step comprises:

preserving the bus signals extant on said bus means of said test system at the occurrence of said terminating step; and distinguishing between failures occurring in said central processing unit and at least one of said bus-coupled subsystems.

11. A method according to claim 10 wherein said preserving step comprises:

collecting central processing unit status information, and system state failure and stuck information respecting address, data and control signals; and said distinguishing step comprises:

determining if said central processing unit is operating in a direct memory access cycle, and if so, designating a bus-coupled subsystem failure, and if not;

determining if said non-coincidence occurred in said data signals, control signals or address signals;

if said non-coincidence occurred in said address signals, designating a central processing unit failure;

if said non-coincidence occurred in said control signals, determining whether said control signals non-coincidence is an input control signal failure or an output control signal failure;

if an input control signal failure occurred, designating a bus-coupled subsystem failure, and if an output control signal failure occurred, designating a central processing unit failure;

if said non-coincidence occurred in said data signals, determining whether said data signals non-coincidence occurred in a write cycle, and if so designating a central processing unit failure but if not designating a bus-coupled subsystem failure.

12. A method according to claim 11 further including the step of identifying the bus-coupled subsystem by examining a memory map of said programmed system and comparing said memory map with current program address, said subsystem identifying step occurring upon the designating of a bus-coupled subsystem failure.

13. A method according to claim 9 further including the step of checking said test system for short circuits prior to said step of synchronously exercising each said system.

14. A method according to claim 13 wherein said short circuit checking comprises:

decoupling said central processing unit from said bus means;

setting designated lines of said bus means to a first state;

examining each of said designated lines for a line stuck in a second state; and individually changing each of said line from said first state to said second state while monitoring to determine if any other ones of said lines changes to said second state in response to said changing.

* * * * *